United States Patent
Castro et al.

(10) Patent No.: US 12,030,786 B2
(45) Date of Patent: Jul. 9, 2024

(54) SODIUM LAYERED OXIDES AS CATHODE MATERIALS FOR SODIUM ION BATTERIES AND METHOD OF MANUFACTURING THE SAME

(71) Applicants: TOYOTA MOTOR EUROPE, Brussels (BE); CENTRE NATIONAL DE LA RECHERCHE SCIENTIFIQUE, Paris (FR)

(72) Inventors: Laurent Castro, Brussels (BE); Jun Yoshida, Brussels (BE); Claude Delmas, Pessac (FR); Marie Guignard, Pessac (FR); Elodie Guerin, Pessac (FR)

(73) Assignees: TOYOTA MOTOR EUROPE, Brussels (BE); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 168 days.

(21) Appl. No.: 17/639,124

(22) PCT Filed: Aug. 27, 2019

(86) PCT No.: PCT/IB2019/000971
§ 371 (c)(1),
(2) Date: Feb. 28, 2022

(87) PCT Pub. No.: WO2021/038263
PCT Pub. Date: Mar. 4, 2021

(65) Prior Publication Data
US 2022/0298024 A1    Sep. 22, 2022

(51) Int. Cl.
*C01G 37/14* (2006.01)
*C01G 45/12* (2006.01)
(Continued)

(52) U.S. Cl.
CPC ............. *C01G 37/14* (2013.01); *C01G 45/12* (2013.01); *C01G 53/44* (2013.01); *H01M 4/385* (2013.01);
(Continued)

(58) Field of Classification Search
CPC .................................................. C01B 25/45
See application file for complete search history.

(56) References Cited

U.S. PATENT DOCUMENTS
2016/0013470 A1    1/2016  Paulsen et al.

FOREIGN PATENT DOCUMENTS
CN    107851790 A    3/2018
JP    2009-209038 A    9/2009
(Continued)

OTHER PUBLICATIONS

May 12, 2020 International Search Report issued in Patent Application No. PCT/IB2019/000971.
Lu, Zhonghua et al., "In Situ X-Ray Diffraction Study of P2-NA2/3[Ni1/3Mn2/3]O2.", Journal of the Electrochemical Society, (2001), vol. 148, No. 11, pp. A1225-A1229.
Paulsen, J.M. et al., "Layered T2-, O6-, and P2-Type A2/3[M'2+1/3M4+2/3]O2 Bronzes, A=Li, Na; M'=Ni, Mg; M=Mn, Ti.", Chemistry of Materials, (2000), vol. 12, No. 8, pp. 2257-2267.
(Continued)

*Primary Examiner* — Khanh T Nguyen
(74) *Attorney, Agent, or Firm* — Oliff PLC

(57) ABSTRACT

A composition of general formula (1): $Na_x[Mn_aNi_bCr_c]O_{2+y}$ (1), wherein: $0.6 \leq x \leq 0.8$; $-0.1 \leq y \leq 0.1$; $0.55 \leq a \leq 0.7$; $0.25 \leq b \leq 0.3$; $c \leq 0.05$; and $a+b+c \leq 1.0$, an intermediate product for preparing a composition of general formula (1) and a process of synthesis, wherein the mixed sodium-transition metal oxide of general formula (1) may generally show an essentially or solely P2 structure, and may be used as a positive electrode material for a sodium ion secondary battery.

12 Claims, 4 Drawing Sheets

O3 — The NaO₆ octahedra only share edges
P3 — The NaO₆ prisms share edges and faces
P2 — The NaO₆ prisms share edges or faces

(51) Int. Cl.
*C01G 53/00* (2006.01)
*H01M 4/38* (2006.01)
*H01M 4/505* (2010.01)
*H01M 4/525* (2010.01)
*H01M 10/054* (2010.01)
*H01M 4/02* (2006.01)

(52) U.S. Cl.
CPC ........... *H01M 4/505* (2013.01); *H01M 4/525* (2013.01); *H01M 10/054* (2013.01); *C01P 2002/76* (2013.01); *C01P 2006/40* (2013.01); *H01M 2004/028* (2013.01)

(56) References Cited

FOREIGN PATENT DOCUMENTS

JP 2013-175311 A 9/2013
WO 2017/009681 A1 1/2017

OTHER PUBLICATIONS

Guo, S. et al., "Understanding sodium-ion diffusion in layered P2 and P3 oxides via experiments and first-principles calculations: a bridge between crystal structure and electrochemical performance," NPG Asia Materials, vol. 8, e266, 2016, 9 pages.

Translation of Feb. 10, 2023 Office Action issued in Chinese Patent Application No. 201980099763.7.

SODIUM LAYERED OXIDES AS CATHODE MATERIALS FOR SODIUM ION BATTERIES AND METHOD OF MANUFACTURING THE SAME

FIELD OF THE INVENTION

The present invention relates to a mixed sodium-transition metal oxide having essentially or solely a P2 structure, an intermediate mixed sodium-transition metal oxide having essentially a P3 structure, and processes for preparing these products. The present invention further relates to a positive electrode for a sodium ion secondary battery comprising the mixed sodium-transition metal oxide having essentially or solely a P2 structure, and to a sodium ion secondary battery having said positive electrode, as well as a negative electrode having a negative electrode active material, and an electrolyte.

BACKGROUND ART

Sodium ion batteries are one of the most favorable candidates for hybrid and electric vehicles of the future because of the low price of sodium raw materials and possible higher performances beyond those of lithium ion batteries. Sodium layered oxides ($Na_xMO_2$, where M is a transition metal) are expected to be useful materials for positive electrodes in view of their high ion diffusivity and capacity leading to higher power and energy. In particular, the P2-type structure is predicted to show favorable structural stability as compared to O3 or P3 structures. However, the battery voltage of $P2-NaMO_2$ is lower than for other lithium lamellar structures.

WO 2017/009681 A1 uses cobalt to improve the capacity of sodium ion batteries based on sodium layered oxides.

US 2016/0013470 A1 describes a doped sodium manganese oxide cathode material for sodium ion batteries. Manganese is the transition metal used in the experimental examples of this reference. In addition, a potential P2 form with general formula $Na_xMO_2$ is mentioned wherein $M=Mn_{1-y-z}Li_yA_z$ where $z<0.2$, $y<0.33$ and $0.66<x<0.95$, and among different elements A could be Ni but at an amount of less than 0.2.

In view of the prior art, it remains a challenge to provide an efficient and high-capacity cathode active material for use in a sodium battery. It is also desirable to provide a safe cathode active material for use in a sodium battery, with high reversible capabilities.

Further, the issue of reasonable cost for industrial production, intrinsically a central feature of sodium batteries, is important. For example, cobalt used in WO 2017/009681 A1 is expensive and it would be desirable not to have to use such a transition metal as a starting material. Furthermore, as part of general industrial and economic efficiency issues, it is desirable to provide a method of producing optimized sodium layered oxides such that side products may be easily isolated and preferably used for other industrial applications.

SUMMARY OF THE INVENTION

In order to address the problems associated with prior art products and processes in the field, the present invention provides, in a first aspect, a composition having the general formula (1) below:

$$Na_x[Mn_aNi_bCr_c]O_{2+y} \quad (1)$$

wherein:
0.6≤x≤0.8;
−0.1≤y≤0.1;
0.55≤a≤0.7;
0.25≤b≤0.3;
c≤0.05; and
a+b+c≤1.0.

In preferred embodiments, −0.05≤y≤0.05, more preferably −0.02≤y≤0.02, still more preferably −0.01≤y≤0.01, and most preferably y is substantially equal to zero (y=0).

The mixed sodium-transition metal oxide of general formula (1) above may appropriately generally show an essentially or solely P2 structure.

The mixed sodium-transition metal oxide of the invention of general formula (1) above, which may show a P2 structure, is expected to be a safe cathode active material for use in a sodium battery. It was found that the addition of Cr atoms in the synthesis enabled the creation of stacking faults (stacking defects in the crystal structure) that increase reversible capabilities for sodium batteries, and may ensure efficiency and high capacity.

At the end of the synthesis process, $Na_2CrO_4$ is formed as a side product and easily separated. $Na_2CrO_4$ is a chemical compound able to be used as a corrosion inhibitor in the petroleum industry, or as a dyeing auxiliary in the textile industry, or a wood preservative or also as a diagnostic pharmaceutical in determining red blood cell volume.

In another aspect, the present invention provides a composition having the general formula (2) below:

$$Na_{x'}[Mn_{a'}Ni_{b'}Cr_{d}]O_{2+y'} \quad (2)$$

wherein:
0.5≤x'≤0.8;
−0.1≤y'≤0.1;
0.5≤a'≤0.7;
0.2≤b'≤0.3;
0≤d≤0.3; and
a'+b'+d≤1.0.

The composition having the general formula (2) above is an intermediate mixed sodium-transition metal oxide, useful in the preparation of compositions having the general formula (1) above. The composition having the general formula (2) above may have essentially a P3 structure. In preferred embodiments of the composition having the general formula (2) above, −0.05≤y'≤0.05, more preferably −0.02≤y'≤0.02, still more preferably −0.01≤y' ≤0.01, and most preferably y' is substantially equal to zero (y'=0).

In a further aspect, the present invention provides a process for the synthesis of a sodium-transition metal oxide comprising the steps of:

(1) preparation of a mixed carbonate and/or hydroxide by reaction of sodium carbonate and/or sodium hydroxide with salts of chromium, nickel and manganese dissolved in water, followed by drying to remove water and obtain a dried mixed carbonate and/or hydroxide;

(2) mixing of the dried mixed carbonate and/or hydroxide obtained in step (1) with further sodium carbonate and/or sodium hydroxide under an inert atmosphere, followed by calcination of the resulting mixture under an inert atmosphere, so as to obtain a sodium-transition metal oxide having essentially a P3-type structure;

(3) mixing of the sodium-transition metal oxide having essentially a P3 structure obtained in step (2) with further sodium carbonate and/or sodium hydroxide, followed by calcination of the resulting mixture under an oxygen-containing atmosphere, so as to obtain a sodium-transition metal oxide having essentially a P2-type structure;

(4) washing of the sodium-transition metal oxide having essentially a P2-type structure obtained in step (3) in order to remove sodium chromate.

In particular, the above process of synthesis may provide, at the end of step (2), an intermediate product in the form of a composition having the general formula (2) set out above and, at the end of step (4), a product in the form of a composition having the general formula (1) set out above.

DETAILED DESCRIPTION OF THE INVENTION

Figure 1:
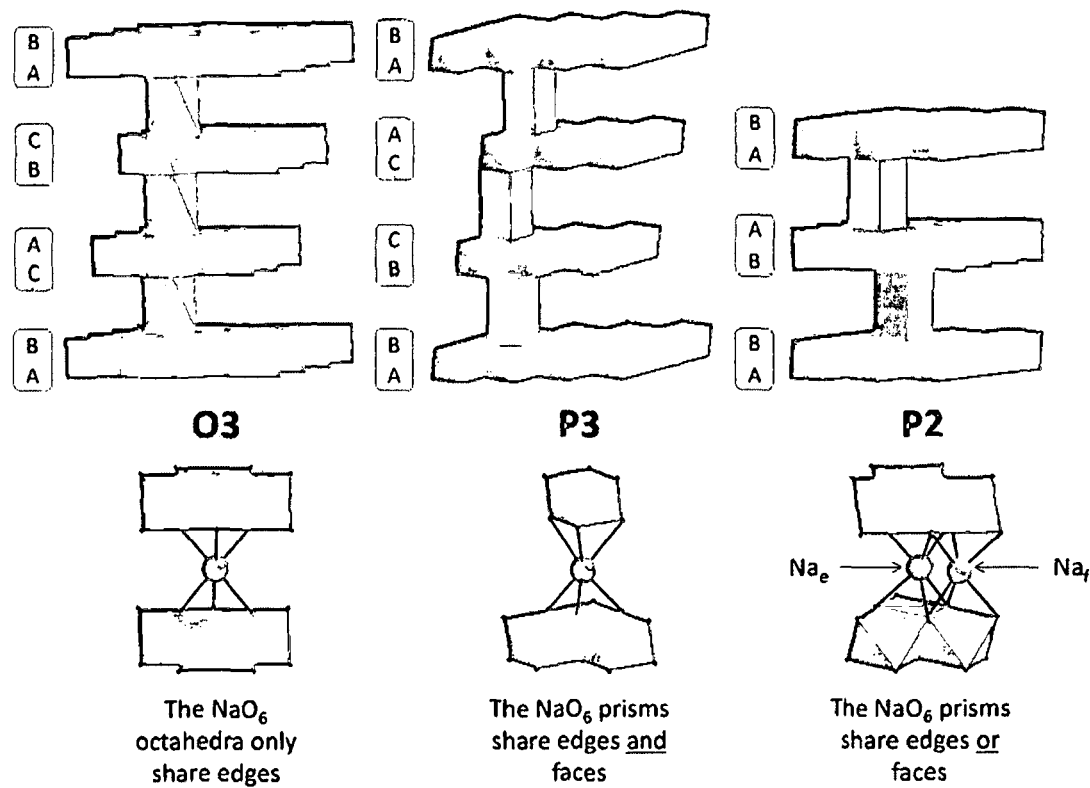
FIG. 1 shows a schematic representation of the O3, P3 and P2 structure types. The Na$^+$ environment in the different structure types is also represented.
Figure 2:
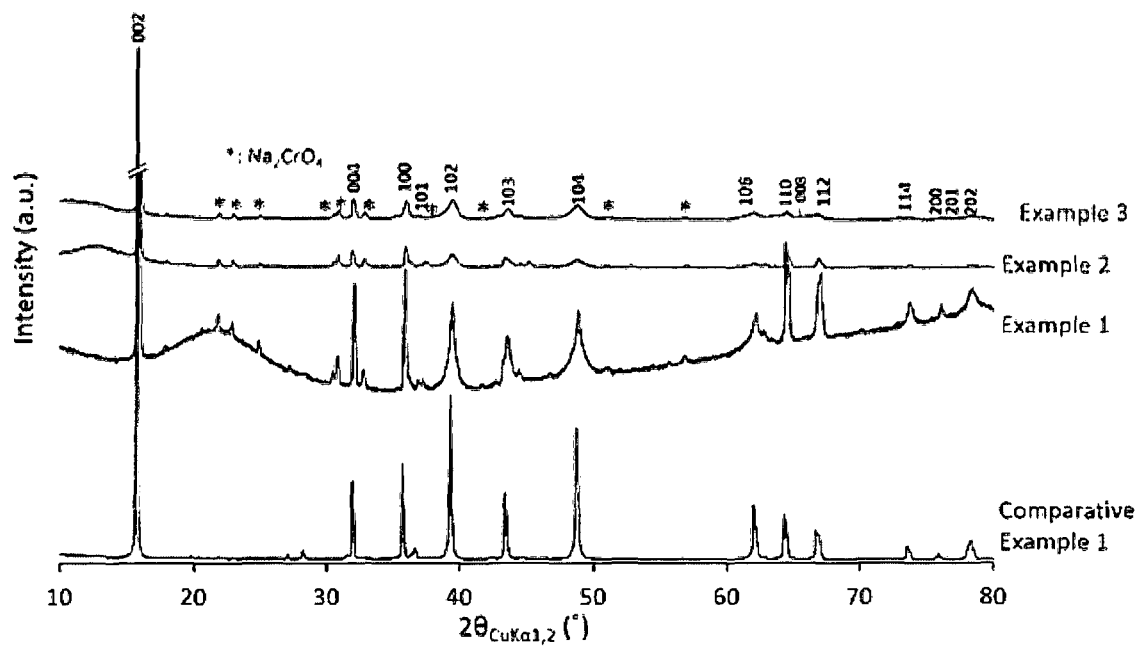
FIG. 2 shows a comparison of XRD patterns obtained after step (3) for the syntheses of Comparative Example 1, Example 1, Example 2, and Example 3.
Figure 3:
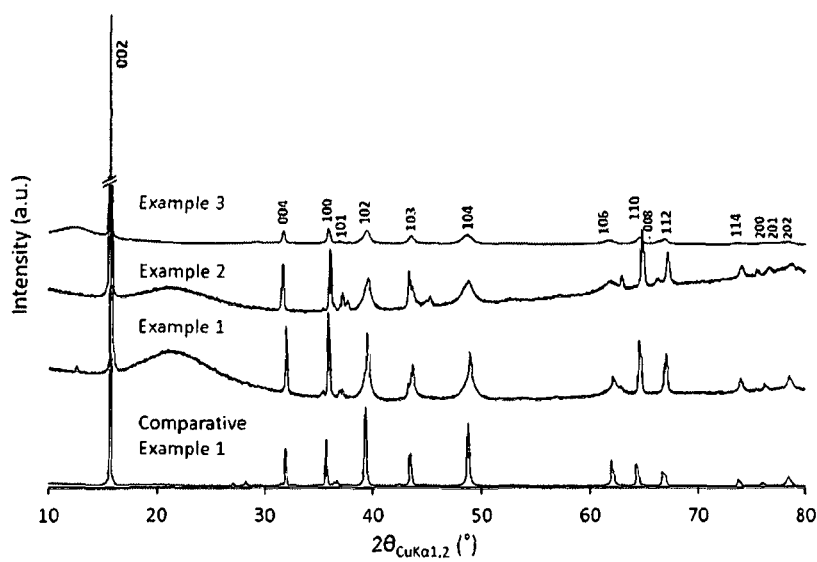
FIG. 3 shows a comparison of XRD patterns obtained after step (4) for the syntheses of Comparative Example 1, Example 1, Example 2, and Example 3.
Figure 4:
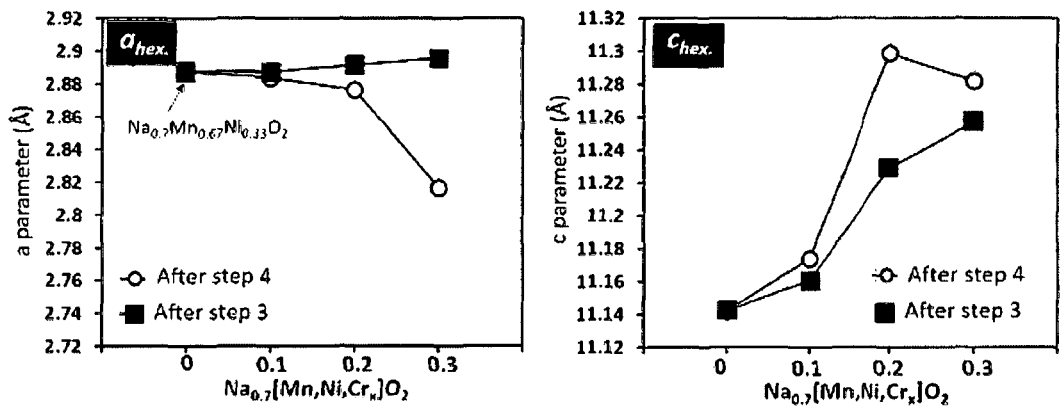
FIG. 4 shows cell parameters obtained for the syntheses of Comparative Example 1, Example 1, Example 2, and Example 3.
Figure 5:
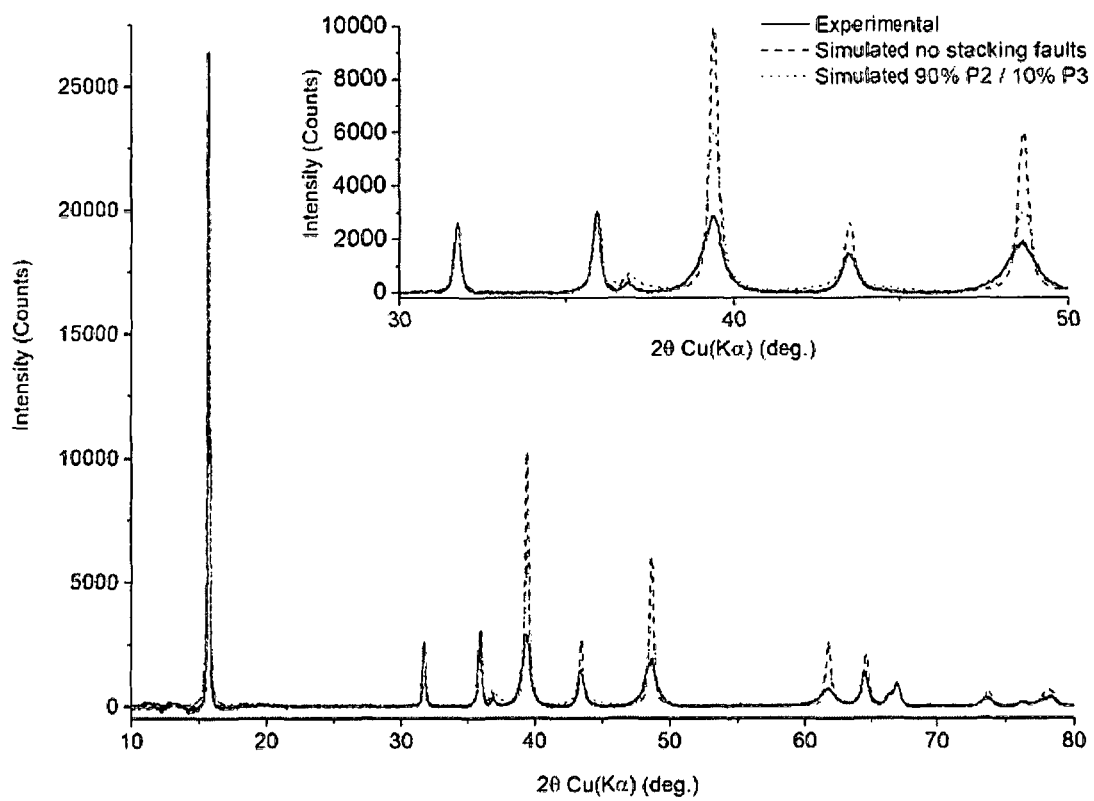
FIG. 5 shows a simulation of an XRD diagram obtained by Diffax explaining defects in Example 3.
Figure 6:
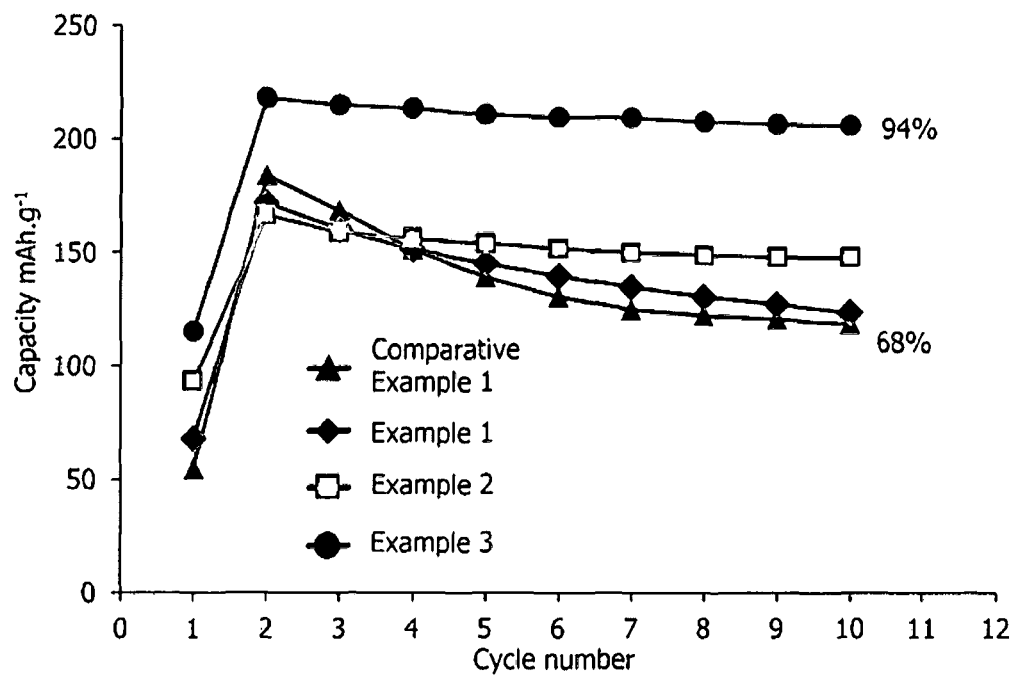
FIG. 6 shows a comparison of battery performance between Comparative Example 1, Example 1, Example 2, and Example 3.

The P2 structure is one of crystal structure types of layered oxide. Layered Na$_x$MO$_2$ (M: transition metal) are classified into several groups denoted by "letter" and "number" like "P2" or "O3", shown in FIG. 1. The letter refers to the site environment of sodium with oxygen (P: prismatic or O: octahedral) and the number indicates the number of MO$_2$ slabs within the hexagonal cell. For instance in the P2 type structure, sodium ions are in trigonal prismatic sites between two MO$_2$ slabs. The higher ion diffusivity in trigonal prismatic environment vs. octahedral is considered due to a large diffusion pass for sodium ion. Moreover, oxygen stacking in the P2 phase is very different from the spinel phase which causes battery decay in a high voltage charge process (Na$^+$ deintercalation). P2 phase never converts to the spinel phase even though a high amount of Na$^+$ intercalates/deintercalates. In view of the high diffusivity and structural stability, P2-type layered oxides are of particular interest.

In the present invention, the sodium-transition metal oxide having essentially or only a P2 structure may be a component of a positive electrode (cathode) for a sodium ion secondary battery. A sodium ion secondary battery may be prepared according to the present invention comprising such a positive electrode, as well as a negative electrode having a negative electrode active material, and an electrolyte.

The process of synthesis of the present invention comprises the following steps:
(1) preparation of a mixed carbonate and/or hydroxide by reaction of sodium carbonate or sodium hydroxide with salts of chromium, nickel and manganese dissolved in water, followed by drying to remove water and obtain a dried mixed carbonate and/or hydroxide;
(2) mixing of the dried mixed carbonate and/or hydroxide obtained in step (1) with further sodium carbonate and/or sodium hydroxide under an inert atmosphere, followed by calcination of the resulting mixture under an inert atmosphere, so as to obtain a sodium-transition metal oxide having essentially a P3-type structure;
(3) mixing of the sodium-transition metal oxide having essentially a P3 structure obtained in step (2) with further sodium carbonate and/or sodium hydroxide, followed by calcination of the resulting mixture under an oxygen-containing atmosphere, so as to obtain a sodium-transition metal oxide having essentially a P2-type structure;
(4) washing of the sodium-transition metal oxide having essentially a P2-type structure obtained in step (3) in order to remove sodium chromate.

In a particularly preferred embodiment, sodium carbonate is used in each of steps (1) to (3) of the process.

The calcination in an inert atmosphere in step (2) of the process produces a layered oxide, containing both sodium and the transition metals Mn, Ni and Cr, and in particular one having essentially a P3-type structure. After calcination in an oxygen-containing atmosphere in step (3) of the process, a P2-type structure or essentially P2-type structure can be obtained. In the final structure, a P2-P3 mixture structure may be obtained, not including the O3 structure, with preferably a P2: P3 range of at least 95% P2: at most 5% P3, more preferably at least 98% P2: at most 2% P3, and particularly preferably P2: P3=100%: 0%.

The P2 structure is sensitive to the sodium amount in the composition during the synthesis at high temperature. As set out for general formula (1) above, the particular range for sodium content is 0.6≤x≤0.8. If the sodium amount is below or above this limited range, the mixed oxide tends to convert to materials with O3 structures or other impurities.

In the present invention, the amount of sodium is appropriately adjusted in order to ensure the creation of Na$_2$CrO$_4$. In the present invention, enough sodium is provided in the synthesis in order obtain an Na$_x$[Mn$_a$Ni$_b$Cr$_c$]O$_2$ P2-type structure and Na$_2$CrO$_4$ through step (4), proceeding via an Na$_{x'}$[Mn$_a$Ni$_b$Cr$_d$]O$_2$ with P3-structure type obtained through step (2). In both these formulae, the oxygen quantity may vary slightly, for example allowing for oxygen vacancies, so that materials of formulae Na$_x$[Mn$_a$Ni$_b$Cr$_c$]O$_{2+y}$ and Na$_{x'}$[Mn$_a$Ni$_b$Cr$_d$]O$_{2+y'}$ may be obtained, wherein −0.1≤y≤0.1 and −0.1≤y'≤0.1.

In the process of the present invention, Cr occupies part of the intermediate phase (P3 phase) obtained after step (2) of the synthesis process involving calcination at a medium temperature (such as 600° C.), and then Cr is removed by reacting with sodium carbonate and/or sodium hydroxide during step (3) of the synthesis process at a high temperature (e.g. around 900° C.), whilst forming Na$_2$CrO$_4$ which is removed with a washing step.

As a consequence, it is considered that the final product contains no chromium (Cr) or only a very small amount of chromium (Cr), but contains stacking defects leading to:
a broadening of the diffraction peak at approximately 490 (2θ (Cu));

a higher capacity.

In preferred process embodiments of the present invention, in step (1), the salts of chromium, nickel and manganese dissolved in water, are nitrates and/or sulfates.

In step (1), the reaction between sodium carbonate (or sodium hydroxide) with salts of chromium, nickel and manganese dissolved in water allows a carbonate (or hydroxide) of chromium, nickel and manganese to be formed, with precipitation. At the same time sodium salts are created with the anionic part of transition metal salt. In this context, it is preferred to wash with the precipitate with distilled water, more preferably repeatedly, for example ten times, in order to dissolve and remove the original anions and sodium ions, keeping at the end of this step (1) only carbonate or hydroxide of chromium, nickel and manganese (as precipitated solid(s)). The removal of substantially all or all the sodium salts at this stage means that it is necessary to provide sodium for the step (2) of the process to produce a P3-form product. Preferably, the drying in step (1) is carried out only after washing, using distilled water, of the initial carbonate (or hydroxide) of chromium, nickel and manganese present as a precipitate.

In preferred process embodiments of the present invention, in step (1), drying is carried out a temperature of at least 50° C. and at most 120° C., for at least 4 hours. More preferably, drying is carried out a temperature of at least 90° C. and at most 110° C., most preferably at approximately 100° C. In preferred process embodiments of the present invention, in step (2), calcining is carried out in an inert atmosphere at a temperature of at least 400° C. and at most 800° C., preferably for at least 2 hours. More preferably, calcining is carried out at a temperature of at least 500° C. and at most 700° C., particularly preferably about 600° C., for duration of at least 4 hours and at most 10 hours, particularly preferably about 6 hours.

In preferred process embodiments of the present invention, in step (3), calcining is carried out in an oxygen-containing atmosphere at a temperature of at least 700° C. and at most 1000° C., preferably for at least 6 hours.

In preferred process embodiments of the present invention, in step (4), washing of the sodium-transition metal oxide obtained in step (3) in order to remove sodium chromate, is carried out using a mixture of water and alcohol, preferably water and ethanol.

The relative amounts of sodium used in the synthesis process (provided in particular as sodium carbonate and/or sodium hydroxide), and of the transition metals Mn, Ni and Cr (provided for example as nitrates or sulfates) are such as to allow the ranges of above-mentioned general formulae (1) and (2) to be satisfied.

Detailed Examples of Synthesis of Materials

<Step 1: Formation of Carbonates $M(CO_3)$>

In an illustrative and non-limiting example, two aqueous solutions, one provided by dissolving a mixture of $Cr(NO_3)_3 \cdot 9H_2O$, $Ni(NO_3)_2 \cdot 6H_2O$ and $Mn(NO_3)_2 \cdot 4H_2O$, and another one prepared using $Na_2CO_3$, were simultaneously dropped into a beaker with 450 ml of distilled water. The precipitate obtained, which was a mixture of carbonates of different cations (Cr, Ni and Mn carbonates), was then washed with distilled water 10 times, and dried at 80° C. for two days.

<Step 2: Formation of the Layered Oxide $Na_{x'}[Mn_aNi_bCr_d]O_2$ with P3-Structure Type>

The variable d in the general formula $Na_{x'}[Mn_aNi_bCr_d]O_2$ is related to the amount of $Cr(NO_3)_3 \cdot 9H_2O$ used during step (1) because at this step, no creation of $Na_2CrO_4$ is expected. It is expected that all the Cr atoms are, at the end of this step, in the layered oxide $Na_{x'}[Mn_aNi_bCr_d]O_2$ with a P3-structure type.

In an illustrative and non-limiting example, the dried powder obtained after step (1) was mixed with $Na_2CO_3$ in a glove box filled under argon in order to order to reach the $Na_{x'}[Mn_aNi_bCr_d]O_2$ composition. The mixture was then calcined at 600° C. for 6 h under Ar (or another non-oxidizing atmosphere) in order to avoid the creation of $Na_2CrO_4$ during this step.

In step (2), at least a stoichiometric amount of sodium source, such as here $Na_2CO_3$, should be added in order to obtain the desired P3 target composition. In order to compensate for a possible loss of Na during this step and to optimize the chances of reaching the target P3 composition, in preferred embodiments an excess of sodium source, such as here $Na_2CO_3$, is preferably added. This excess is preferably around 10% and can be at least 5% and at most 15%. Thus, the number of moles of Na added in the sodium source in step (2), the sodium source being sodium carbonate and/or sodium hydroxide, and most preferably sodium carbonate, is appropriately chosen to be at least 1.05 and at most 1.15 of the quantity calculated based on the value of x' in the composition of formula (2) to be synthesized, with respect to the relative amounts in moles of Mn, Ni and Cr represented by a', b' and d' in formula (2).

<Step 3: Formation of P2-$Na_x[Mn_aNi_bCr_c]O_2$+$Na_2CrO_4$>

At the beginning of this stage, essentially all the Cr atoms are expected to be in the P3-$Na_x[Mn_aNi_bCr_c]O_2$ phase.

An addition of $Na_2CO_3$ was carried out with the powder obtained at the end of step 2 in order to compensate for the creation of $Na_2CrO_4$ and to make possible the formation of P2 structure type expected during this step. In effect, during this stage, $Na_2CO_3$ is added in order to make Cr atoms react when they are displaced (ejected) during the P3→P2 transformation.

A heat treatment of this mixture was then carried out at 900° C. for 12 hours in air. At the end of this stage a powder of P2 form with composition P2-$Na_x[Mn_aNi_bCr_c]O_2$ is obtained with $Na_2CrO_4$. The amount of $Na_2CrO_4$ obtained is related to the amount of $Cr(NO_3)_3 \cdot 9H_2O$ and addition of $Na_2CO_3$ used during the step because only a very small amount (c) of Cr is expected to stay in the P2-type structure. Most preferably c is substantially zero (c=0) thanks to the quantity of $Na_2CO_3$ added (see values between parentheses in the right-hand column in Table 1 below). However, it is possible that a small amount of P2 phase (with Cr atoms) may remain at the end of this stage, which is why the quantity of $Na_2CO_3$ can be adjusted added to keep 5% (c=0.05) of Cr (see values right-hand column in Table 1).

<Step 4: Washing of the Powder for Removing $Na_2CrO_4$>

From the mixture obtained at the end of step 3, $Na_2CrO_4$ was eliminated by washing the mixture six times with a with a solution of water/ethanol (50/50 in volume). $Na_2CrO_4$ is soluble and P2-$Na_x[Mn_aNi_bCr_c]O_2$ is insoluble in this solution. P2-$Na_x[Mn_aNi_bCr_c]O_2$ was filtered out of the solution and dried under vacuum for 2 hours at 200° C. The materials obtained are listed in Table 1.

TABLE 1

Summary of amount of raw materials (in grams) needed for
Comparative Example 1, Example 1, Example 2, Example 3

| | Targeted P3 composition | $Mn(NO_3)_2$ | $Ni(NO_3)_2$ | $Cr(NO_3)_3$ | $Na_2CO_3$ used in step 1 | $Na_2CO_3$ used in step 2 10% excess (5%) (15%) | $Na_2CO_3$ used in step 3 if c (Cr molar amount in claim 1) = 0.05 (if c = 0) |
|---|---|---|---|---|---|---|---|
| Comparative Example 1 | $Na_{0.7}[Mn_{0.65}Ni_{0.35}]O_2$ | 1.1147 | 0.6128 | 0.0000 | 1.0158 | 0.3911 (0.3733) (0.4088) | 0.0000 |
| Example 1 | $Na_{0.7}[Mn_{0.6}Ni_{0.3}Cr_{0.1}]O_2$ | 1.0338 | 0.5277 | 0.2292 | 1.0205 | 0.3929 (0.3750) (0.4107) | 0.0969 (0.1020) |
| Example 2 | $Na_{0.7}[Mn_{0.55}Ni_{0.25}Cr_{0.2}]O_2$ | 0.9520 | 0.4418 | 0.4605 | 1.0252 | 0.3947 (0.3768) (0.4127) | 0.1948 (0.2050) |
| Example 3 | $Na_{0.7}[Mn_{0.5}Ni_{0.2}Cr_{0.3}]O_2$ | 0.8695 | 0.3551 | 0.6939 | 1.0300 | 0.3966 (0.3785) (0.4146) | 0.2936 (0.3090) |

The amounts of nitrates of transition metals indicated in the Table above are given as (equivalent) weights of dry nitrates without water (these products are easily hydrated). Hydrated transition metal salts such as nitrate may however be used in actual syntheses.

In advantageous embodiments, in step 1, the quantity of sodium carbonate used is substantially equimolar (in terms of the amount of Na present) with respect to the sum of the moles of nitrate of transition metals (Mn+Ni+Cr).

In step 2, an excess of 10% of Na in moles is preferably added with respect to the amount of Na source, such as sodium carbonate, needed to produce the P3 target composition. A preferable range of molar excess is from 5% to 15%.

<Characterization of Materials>

XRD

The structure of the samples obtained was evaluated by X-ray diffraction (XRD). XRD patterns were recorded on a diffractometer (D5000, Bruker or Empyrean Panalytical) equipped with a Cu target. Cell parameter refinements were performed using the LeBail method in the FullProf program.

For the simulation of XRD diagrams, DIFFaX software [http://www.public.asu.edu/~mtreacy/DIFFaX.html] was used to simulate the X-ray diffraction pattern of $Na_x[Mn_{1-y}Ni_y]O_2$. It was considered that the structure of this phase could be described as a random stack of layers of P2- and P3-type structures. In the simulation, a start was made from a pure P2-type structure and random P3-type layers were gradually added. The final structure was a P3-type one. Although none of the simulated X-ray diffraction patterns matched perfectly with the experimental data, the DIFFAX simulations obtained did show how remaining P3-type stacking defects in the P2-type structure can reasonably explain broadening of the diffraction peaks in this system.

<Electrochemical Performance>

The positive electrode used was a mixture containing 88 wt. % of the active material, 10 wt. % of carbon black as electronic conductor and 2 wt. % of polytetrafluoroethylene (PTFE) as binder. The electrolyte was 1 M $NaPF_6$ in propylene carbonate with 2 wt. % of fluoroethylene carbonate (FEC) as additive. Electrochemical properties were evaluated by galvanostatic mode using VMP-3 (Biologic). Galvanostatic performances were evaluated at a C/20 current rate in a range between 1.5 V and 4.3 V. All the cell voltages are given vs. $Na^+/Na$ redox couple.

<Sodium Ion Battery Structure>

Figure 7:
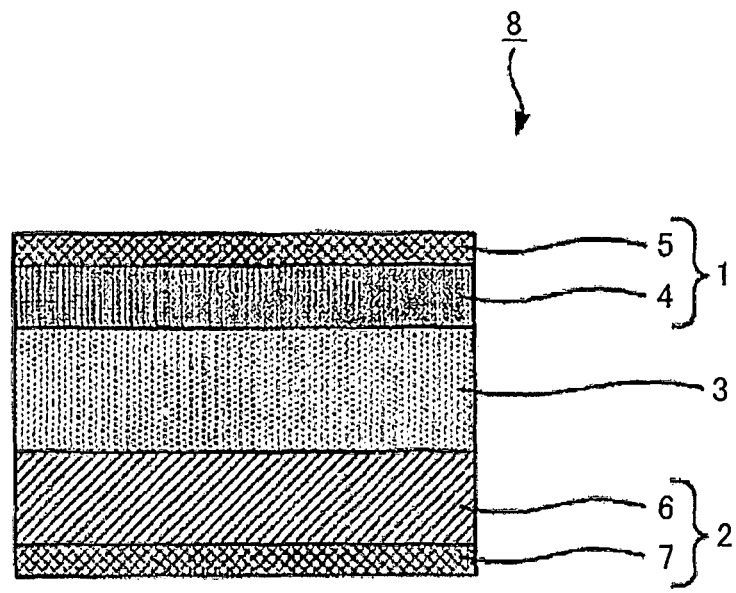
FIG. 7 is a schematic cross-sectional diagram showing an embodiment of a sodium secondary battery.

FIG. 7 is a schematic cross-sectional diagram showing an embodiment of a sodium secondary battery. As shown in FIG. 7, the sodium secondary battery 8 generally has a structure in which an electrolyte layer 3 is disposed between a negative electrode 1 and a positive electrode 2. The negative electrode 1 has a negative electrode active material layer 4 containing a negative electrode active material, and a negative electrode current collector 5 which carries out charge collection for the negative electrode active material layer 4. The positive electrode 2 has a positive electrode active material layer 6 containing a positive electrode active material, and a positive electrode current collector 7 which carries out charge collection for the positive electrode active material layer 6.

In the following paragraphs, each element of battery structure is explained.

The negative electrode contains a negative electrode active material capable of the insertion and extraction of sodium ions. The negative electrode generally has a negative electrode active material layer which includes at least a negative electrode active material. Where necessary, it may also have a negative electrode current collector which carries out charge collection for the negative electrode active material layer.

Illustrative examples of the negative electrode active material include hard carbon, Na metal and tin.

The negative electrode active material layer may contain only a negative electrode active material or may, in addition to the negative electrode active material, contain also a binder, a conductive material, an electrolyte and the like. For example, in cases where the negative electrode active material is in the form of a sheet or foil, it may be rendered into a negative electrode layer which contains only the negative electrode active material. On the other hand, in cases where the negative electrode active material is in the form of a powder, it may be rendered into a negative electrode layer which includes a binder in addition to the negative electrode active material.

Illustrative examples of the binder include polyvinylidene fluoride (PVdF), polytetrafluoroethylene (PTFE) and styrene-butadiene rubber (SBR). Illustrative examples of the conductive material include carbon materials such as carbon black, activated carbon, carbon fibers (e.g., carbon nanotubes, carbon nanofibers), and graphite.

The positive electrode contains a positive electrode active material capable of the insertion and extraction of sodium ions. The positive electrode generally has a positive electrode active material layer which includes at least a positive electrode active material. Where necessary, it may also have a positive electrode current collector which carries out charge collection for the positive electrode active material layer.

The positive electrode active material used may be the above-described positive electrode active material of the invention or may be a positive electrode active material produced by the production method of the invention.

As with the negative electrode active material layer, the positive electrode active material layer may contain only a positive electrode active material or may, in addition to the positive electrode active material, contain also a conductive material, a binder, an electrolyte, an electrode catalyst and the like. Because materials similar to those in the negative electrode active material may be used as the conductive material and binder in the positive electrode active material, descriptions of these are omitted below.

In the case of both the negative electrode active material layer and the positive electrode active material layer, the electrode active material layer may be formed by using any suitable coating method, such as dip coating, spray coating, roll coating, doctor blade coating, gravure coating or screen coating, to coat, dry, and optionally roll, slurries containing the respective materials.

The positive electrode current collector and the negative electrode current collector are not subject to any particular limitations with regard to material, structure or shape, provided they are materials which have the desired electron conductivity and which do not give rise to alloying reactions with sodium ion in the environment within the battery.

Illustrative examples of the material making up the positive electrode current collector include metal materials such as stainless steel, nickel, aluminum, iron, titanium and copper, carbon materials such as carbon fibers and carbon paper, and ceramic materials having a high electron conductivity, such as titanium nitride. It is possible for the battery case to serve also as the positive electrode current collector.

Illustrative examples of the material making up the negative electrode current collector include copper, stainless steel, nickel and aluminum. It is possible for the battery case to serve also as the negative electrode current collector.

The positive electrode current collector and the negative electrode current collector may each be in the form of, for example, a sheet, foil or mesh. Among these, a mesh is preferred.

The electrolyte layer includes at least an electrolyte which enables the conduction of sodium ions between the positive electrode and the negative electrode. An organic electrolyte, a polymer electrolyte or a solid electrolyte may appropriately be used in the batteries using the cathode material of the present invention.

The electrolyte should be one having sodium ion conductivity and is exemplified by electrolyte solutions, gel-like electrolytes obtained by the gelation of an electrolyte solution with a polymer or the like, and solid electrolytes.

Examples of electrolyte solutions having sodium ion conductivity include electrolyte solutions obtained by dissolving a sodium salt in an aqueous solvent or a nonaqueous solvent.

Illustrative examples of non-aqueous solvent include, but are not particularly limited to, cyclic carbonates such as propylene carbonate (PC), ethylene carbonate (EC) and fluoroethylene carbonate (FEC), cyclic esters such as γ-butyrolactone (GBL), and acyclic carbonates such as dimethyl carbonate (DMC), diethyl carbonate (DEC) and ethyl methyl carbonate (EMC). These non-aqueous solvents may be used singly or two or more may be used in combination. Alternatively, a nitrile compound having a CN group bonded to the end of an acyclic saturated hydrocarbon compound may be used in admixture with a non-aqueous solvent. By adding a nitrile compound to a non-aqueous solvent-type electrolyte solution, there can be obtained a stable non-aqueous solvent-based electrolyte solution which is stable and does not decompose even in a high potential region.

Illustrative examples of the sodium salt include, but are not particularly limited to, $NaPF_6$, $NaBF_4$, $NaClO_4$, $NaCF_3SO_3$, $(CF_3SO_2)_2NNa$, $NaN(FSO_2)$ and $NaC(CF_3SO_2)_3$. These sodium salts may be used singly, or two or more may be used in combination. $NaPF_6$, which is stable also at high potentials, is especially preferred.

No particular limitation is imposed on the concentration of the sodium salt in the non-aqueous electrolyte solution.

The non-aqueous electrolyte solution may also be used following gelation by the addition of a polymer. The method of gelating the non-aqueous electrolyte solution is exemplified by a method that involves adding a polymer such as polyethylene oxide (PEO), polyacrylonitrile (PAN), PVdF or polymethyl methacrylate (PMMA) to a non-aqueous electrolyte solution.

In cases where an electrolyte solution is used as the electrolyte, insulation between the positive electrode and the negative electrode can be achieved by disposing an insulating porous body as a separator between the positive electrode and the negative electrode, and impregnating the separator with the electrolyte solution. The separator is exemplified by porous membranes such as polyethylene porous membranes and polypropylene porous membranes; and nonwoven fabrics such as resin nonwoven fabrics and glass fiber nonwoven fabrics.

The battery case used to house the negative electrode, the electrolyte layer and the positive electrode may be one having a common shape, such as a coin-like, flat plate-like, tubular or laminate-type battery case.

In batteries having a construction in which laminates of a positive electrode, an electrolyte layer and a negative electrode disposed in this order are repeatedly stacked in multiple layers, from the standpoint of safety, separators composed of an insulating material can be provided between the adjoining positive and negative electrodes. Illustrative examples of such separators include porous membranes such as polyethylene porous membranes and polypropylene porous membranes; and nonwoven fabrics such as resin nonwoven fabrics and glass fiber nonwoven fabrics.

In addition, terminals serving as connectors to the exterior can be provided on the current collectors for the respective electrodes.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

The invention claimed is:

1. A process for synthesizing a sodium-transition metal oxide having a P2-P3 mixture structure or a P2 structure, not including an O3 structure, comprising the steps of:
   (1) preparation of a mixed carbonate and/or hydroxide by reaction of sodium carbonate or sodium hydroxide with salts of chromium, nickel and manganese dissolved in water, followed by drying to remove water and obtain a dried mixed carbonate and/or hydroxide;
   (2) mixing of the dried mixed carbonate and/or hydroxide obtained in step (1) with further sodium carbonate and/or sodium hydroxide under an inert atmosphere, followed by calcination of the resulting mixture under an inert atmosphere, so as to obtain a sodium-transition metal oxide having essentially a P3-type structure;
   (3) mixing of the sodium-transition metal oxide having essentially a P3 structure obtained in step (2) with further sodium carbonate and/or sodium hydroxide, followed by calcination of the resulting mixture under an oxygen-containing atmosphere, so as to obtain a sodium-transition metal oxide having essentially a P2-type structure;
   (4) washing of the sodium-transition metal oxide having essentially a P2-type structure obtained in step (3) in order to remove sodium chromate.

2. The process according to claim 1, wherein in step (1), the salts of chromium, nickel and manganese dissolved in water, are nitrates and/or sulfates.

3. The process according to claim 1, wherein in step (1), drying is carried out a temperature of at least 50° C. and at most 120° C., for at least 4 hours.

4. The process according to claim 1, wherein the sodium carbonate and/or sodium hydroxide added in step (2) represent a number of moles of Na of at least 1.05 and at most 1.15 of a quantity calculated based on a value of x in a composition of formula (1) to be synthesized, with respect to relative amounts in moles of Mn, Ni and Cr represented by a, b and c in formula (1):

$$Na_x[Mn_aNi_bCr_c]O_{2+y} \quad (1)$$

wherein:
$0.5 \leq x \leq 0.8$;
$-0.1 \leq y \leq 0.1$;
$0.5 \leq a \leq 0.7$;
$0.2 \leq b \leq 0.3$;
$0 < c \leq 0.3$; and
$a+b+c \leq 1.0$.

5. The process according to claim 1, wherein in step (2), calcining is carried out in an inert atmosphere at a temperature of at least 400° C. and at most 800° C. for at least 2 hours.

6. The process according to claim 1, wherein in step (3), calcining is carried out in an oxygen-containing atmosphere at a temperature of at least 700° C. and at most 1000° C. for at least 6 hours.

7. The process according to claim 1, wherein in step (4), washing of the sodium-transition metal oxide obtained in step (3) in order to remove sodium chromate, is carried out using a mixture of water and alcohol.

8. The process according to claim 1, wherein sodium carbonate is added in each of steps (1) to (3).

9. A composition having a P2-P3 mixture structure or a P2 structure, not including an O3 structure, and having a general formula (1) below:

$$Na_x[Mn_aNi_bCr_c]O_{2+y} \quad (1)$$

wherein:
$0.5 \leq x \leq 0.8$;
$-0.1 \leq y \leq 0.1$;
$0.5 \leq a \leq 0.7$;
$0.2 \leq b \leq 0.3$;
$0 < c \leq 0.3$; and
$a+b+c \leq 1.0$.

10. A positive electrode for a sodium ion secondary battery comprising the composition of claim 9.

11. A sodium ion secondary battery having the positive electrode for a sodium ion secondary battery according to claim 10, a negative electrode having a negative electrode active material, and an electrolyte.

12. The composition according to claim 9, wherein:
$0.6 \leq x \leq 0.8$;
$0.55 \leq a \leq 0.7$;
$0.25 \leq b \leq 0.3$; and
$0 < c \leq 0.05$.

* * * * *